United States Patent [19]
Kafka et al.

[11] Patent Number: 5,847,861
[45] Date of Patent: Dec. 8, 1998

[54] SYNCHRONOUSLY PUMPED SUB-PICOSECOND OPTICAL PARAMETRIC OSCILLATOR

[76] Inventors: James D. Kafka, 928 Wright Ave, #302, Mountain View, Calif. 94043; Michael L. Watts, 32811 Orick St., Union City, Calif. 94587; Jan-Willem J. Pieterse, 4992 Augusta Way, San Jose, Calif. 95129; Kevin K. Holsinger, 190 E. O'Keefe St. #9, Menlo Park, Calif. 94025

[21] Appl. No.: 239,266

[22] Filed: May 6, 1994

Related U.S. Application Data

[63] Continuation-in-part of Ser. No. 58,743, Apr. 29, 1993, Pat. No. 5,365,366.

[51] Int. Cl.[6] .................................................. G02F 1/39
[52] U.S. Cl. .............................................. 359/330; 372/22
[58] Field of Search .................................. 359/326–332; 372/20–23

[56] References Cited

U.S. PATENT DOCUMENTS

| | | | |
|---|---|---|---|
| 5,017,806 | 5/1991 | Edelstein et al. | 359/330 |
| 5,134,622 | 7/1992 | Deacon | 372/21 |
| 5,144,630 | 9/1992 | Lin | 372/22 |
| 5,159,487 | 10/1992 | Geiger et al. | 359/330 |
| 5,206,868 | 4/1993 | Deacon | 372/21 |
| 5,365,366 | 11/1994 | Kafka et al. | 359/330 |
| 5,406,408 | 4/1995 | Ellingson et al. | 359/330 |
| 5,579,152 | 11/1996 | Ellingson et al. | 359/330 |

FOREIGN PATENT DOCUMENTS

| 4-67131 | 3/1992 | Japan | 359/330 |
|---|---|---|---|

OTHER PUBLICATIONS

Chesnoy, et al.; Stabilization of a Femtosecond Dye Laser Synchronously Pumped by a Frequency–Doubled Mode–Locked Yag Laser.; Oct. 1986/vol. 11, No. 10/Optics Letters; 1986, Optical Society of America; pp. 635–637.

Knox, et al.; Two–Wavelength Synchronous Generation of Femtosecond Pulses With<100–FS Jitter; Jul. 15, 1992/vol. 17, No. 14/Optics Letters; 1992, Optical Society of America; pp. 1012–1014.

*Primary Examiner*—John D. Lee
*Attorney, Agent, or Firm*—Wison, Sonsini, Goodrich & Rosati

[57] ABSTRACT

A synchronously pumped optical parametric oscillator (OPO) using a temperature tuned 90 degree phase matched LBO crystal is disclosed which provides a broad selection of output wavelengths. In one embodiment a Ti:sapphire pump source having a cavity length matched to the OPO cavity length pumps a cavity with an LBO crystal located at the cavity waist of the cavity mode. Resources are included to, tune the OPO to a desired wavelength, repetitively scan through a series of desired wavelengths, and adjust the cavity length to obtain a synchronous pumping condition and diagnose a wavelength at which the OPO is operating. A frequency doubled beam in the LBO crystal is generated as a substantially collinear alignment beam.

36 Claims, 7 Drawing Sheets

SYNCHRONOUSLY PUMPED SUB-PICOSECOND OPTICAL PARAMETRIC OSCILLATOR

CONTINUING APPLICATION DATA

The present application is a continuation-in-part of Ser. No. 08/058,743, filed Apr. 29, 1993, entitled "Synchronously Pumped Sub-Picosecond Optical Parametric Oscillator", now U.S. Pat. No. 5,365,366 and assigned to the same assignee of the present application.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND OF THE INVENTION

1. Field of the Invention

The present invention relates to optical parametric oscillators. More particularly, the present invention relates to a synchronously pumped optical parametric oscillator (OPO) for generating high-power, broadly tunable pulses with sub-picosecond duration that includes resources to tune the OPO to a desired wavelength, repetitively scan through a series of desired wavelengths, adjust the cavity length to obtain the synchronous pumping condition, diagnosis a wavelength at which the OPO is operating, and generate a frequency doubled beam in the LBO crystal as a substantially collinear alignment beam.

2. Description of the Related Art

Optical parametric oscillators (OPO) have been known for many years. Recently, cw mode-locked OPO's have been introduced. The first system was demonstrated by E. S. Wachtman, D. C. Edelstein, and C. L. Tang, Opt. Lett. 15, 136 (1990) and used a CPM laser as the pump source. The nonlinear crystal was $KTiOPO_4$ (KTP) which has the highest nonlinear coefficient of any suitable crystal, and thus the greatest chance of reaching threshold. To obtain sufficient pump power the KTP crystal was placed both inside an OPO cavity and inside the CPM cavity. This increased the pump power by two orders of magnitude, and greatly increased the complexity of the system as described in the Edelstein et al. article. The wavelength of the OPO is adjusted by rotation of the crystal.

Recently, cw mode-locked Ti:sapphire lasers have been demonstrated. These lasers are capable of reaching the same peak powers outside the cavity as inside the CPM laser and are thus useful as pump sources. The average power output of a cw mode-locked Ti:sapphire laser is typically 1 to 2 Watts, with a pulse duration of about 100 femtoseconds. KTP OPO's using this pump source have been demonstrated by several groups. Q. Fu, G. Mak, and H. M. van Driel, Opt. Lett. 17, 1006 (1992) used 110 femtosecond pump pulses and angle-tuned KTP to produce tunable sub-picosecond pulses. W. S. Pelough, P. E. Powers, and D. L. Tang, Opt. Lett. 17, 1070 (1992) obtained similar results using 125 femtosecond pump pulses and angle tuned KTP.

A. Nebel, U. Socha, and R. Beigang, in Digest of Conference on Ultrafast Phenomena VIII, (E.N.S.T.A. Paris 1992) paper ThC1, used a 1.4 picosecond Ti:sapphire laser and a 90 degree phase matched KTP crystal to produce tunable picosecond pulses. This crystal configuration has several advantages over the angle tuned system in that the nonlinear coefficient is maximum and there is no walkoff. Both of these attributes contribute to a more efficient OPO with potentially higher output power. In addition, because of the lack of walkoff (between the pump beam and the OPO beam) the alignment procedure can be made significantly simpler than in the angle tuned systems. One drawback, however, is that the crystal can no longer be rotated to tune the output. The output of the pump laser had to be tuned in order to tune the output.

The angle-tuned KTP systems have several drawbacks. When the OPO is tuned, the crystal is rotated. The cavity length must then be adjusted and the cavity realigned after rotation of the crystal. To obtain the widest possible tuning range, multiple crystals may be necessary due to the AR coatings required. The alignment is complicated because the pump beam and the OPO beam are not collinear. This walkoff requires the pump beam to be brought in at a specified angle to the OPO beam. The beams must also be focussed to less than 50 microns and cross in the nonlinear crystal.

Using 90 degree phase matched KTP removes the walkoff problem and simplifies the alignment. The pump laser must be tuned, however, and then the dispersion of the pump laser must be adjusted. Then the OPO cavity length needs to be reoptimized. In addition, multiple sets of optics are required for the pump laser. Even with these additional optics sets, the tuning range of the OPO is limited, and a region of non-coverage exists between 1.5 and 2.2 microns. In addition, the output power will drop severely at longer wavelengths due to the drop in pump power.

Only a few crystals, other than KTP, have been successfully demonstrated in a cw synchronously pumped OPO, and one is $LiB_3O_5$ (LBO). A. Robertson, G. P. A. Malcolm, M. Ebrahimzadeh, and A. I. Ferguson, Postdeadline paper CPD15 from CLEO 1992, demonstrated an LBO OPO utilizing a 2.5 picosecond pulse at 524 nm from a frequency-doubled, mode-locked Nd:YLF laser as the pump source. They generated picosecond pulses using 90 degree phase-matched LBO and used temperature tuning to tune the output. The crystal length was 12 mm and the authors state that it should be possible to generate femtosecond pulses by using a pulse-compressed pump source.

The 90 degree phase matched LBO crystal has all the advantages of 90 degree phase matched KTP with the added advantage of temperature tuning. In particular, only the temperature and the cavity length need to be adjusted to tune the OPO. In the case of angle tuned OPO's, the cavity must also be realigned slightly if the OPO is tuned over any significant wavelength difference. Unfortunately, the change in index of LBO with respect to temperature is not a well known quantity. The early published data is in S. P. Velsko, M. Webb, L. Davis and C. Huang, IEEE J. Quantum Electron. 27, 2182 (1991); and S. Lin, J. Y. Huang, J. Ling, C. Chen, and Y. R. Shen, Appl. Phys, Lett. 59, 2805 (1991). The data from these papers is contradictory and does not accurately predict the observed performance. Whether the LBO crystal would work with a Ti:sapphire pump at 800 nm at a reasonable temperature (less than 200 degrees C.) was not known and cannot be predicted from the literature. This is why Robertson teaches to compress the 524 nm source as opposed to switching to a Ti:sapphire pump. It is widely believed that the crystal temperature would be too hot for 800 nm pumping.

There is a need to provide an OPO which can generate broadly tunable pulses with sub-picosecond duration and includes software and hardware resources that, (i) tunes the OPO to a desired wavelength and, (ii) provides scannable tuning through a series of desired wavelengths, (iii) adjusts the cavity length of the OPO to obtain the synchronous pumping condition of the OPO and (iv) diagnose a wavelength at which the OPO is operating. Additionally, there is a desire to generate a frequency doubled beam in the LBO crystal as a substantially collinear alignment beam.

SUMMARY OF THE INVENTION

Accordingly, it is an object of the present invention to provide an OPO which can generate broadly tunable pulses with sub-picosecond duration, and automatically tune the OPO to a desired wavelength.

Another object of the present invention is to provide an OPO which can generate broadly tunable pulses with sub-picosecond duration, and repetitively scan through a series of desired wavelengths.

Yet another object of the present invention is to provide an OPO which can generate broadly tunable pulses with sub-picosecond duration and provides resources to initially adjust the cavity length of the OPO cavity to obtain the synchronous pumping condition.

Still a further object of the present invention is to provide an OPO which can generate broadly tunable pulses with sub-picosecond duration that is capable of automatically diagnose the wavelength at which the OPO is operating at.

These and other objects of the invention are obtained with a synchronously pumped, optical parametric oscillator that has a cavity with an optical path, and an LBO crystal disposed in the optical path in the cavity at a beam waist position. A high power pump source generates subpicosecond pulses in the range of 700 to 900 nm range, and is oriented to supply pump pulses to the LBO crystal. The cavity length is selected to produce a synchronous pumping condition. A temperature control device controls the temperature of the LBO crystal to within at least about 2 degrees C. Resources are included to tune the OPO to a desired wavelength.

Additionally, the resources can repetitively scan through a series of desired wavelengths. The resources can provide initial alignment of the cavity length of the OPO to obtain synchronous alignment as well as diagnose a wavelength at which the OPO is operating at. The present invention also provides a device to generate a frequency doubled beam in the LBO crystal as a substantially collinear alignment beam.

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled persons.

It is known in the art that most nonlinear crystals do not have sufficient nonlinearity to work in a cw synchronously pumped OPO. At present only LBO, BBO, KTP, KTA, RTA and $KNBO_3$ appear to be candidates. Of these, only LBO and $KNbO_3$ can be used 90 degree phase matched and temperature tuned. It has been determined that this combination of a high power, sub-picosecond pump source, generating pulses in the range of 700 to 900 nm, and 90 degree phase matched LBO provides a unique source of tunable, high power, sub-picosecond pulses. The pump sources include but are not limited to Ti:sapphire; diode pumped Li:SAF, Li:CAF and Li:SCAF. The preferred pump source is Ti:sapphire. High power is one-half W or greater. Other powers, such as one watt, or 2 watts are preferred.

Figure 1A:
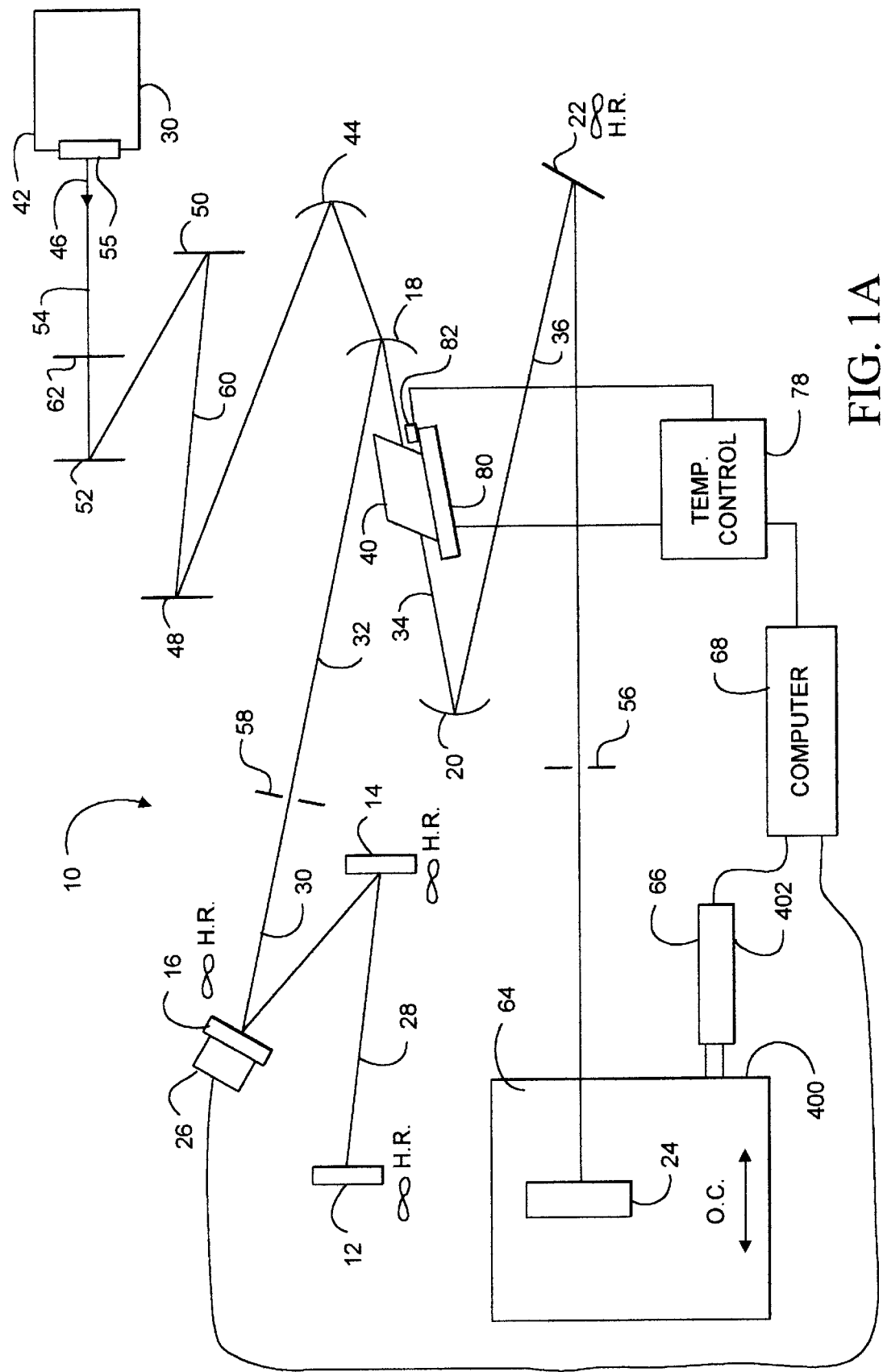
FIG. 1(A) is a block diagram of a synchronously pumped, temperature-tuned 90 degree phase matched LBO crystal optical parametric oscillator (OPO) according to a presently preferred embodiment of the invention.

Referring to FIG. 1(A), a synchronously pumped, temperature-tuned 90 degree phase matched LBO crystal optical parametric oscillator (OPO) 10 according to the present invention, is shown in block diagram form. A cavity is defined by highly reflective mirror 12, highly reflective mirror 14, highly reflective mirror 16, curved mirrors 18 and 20, highly reflective mirror 22, and output coupler 24.

Highly reflective mirrors 12, 14, 16 and 22 may be formed on a substrate such as part No. G0324-000 or G3801-000. Curved mirrors 18 and 20 may be formed on a substrate part No. G0079-000 and may have curvatures of 10 cm. Output coupler 24 may be formed on a substrate part No. G0324-000. These substrates are available from the Components and Accessories Group of Spectra-Physics Lasers of Mountain View, Calif. The substrates of mirrors 12, 14, 16 and 22 should be coated so as to be highly reflective from 1.1 to 1.6 microns, and may need to be provided as separate sets of optics for different portions of the bandwidth of interest as will be appreciated by those of ordinary skill in the art. Output coupler 24 should be coated to be between about 1% to 20% transmissive at the same wavelengths used for the design of the other mirrors.

Positioned on the back side of highly reflective mirror 16 is a piezoelectric transducer 26. Piezoelectric transducer 26 is placed in an intermediate position within the cavity, rather than at one of its ends, in order to give twice the physical translation. For example, if piezoelectric transducer 26 has a range of 8 microns, then by placing it in the middle of the cavity a 16 micron change of cavity length can be achieved.

A six-legged, zig-zig optical path through the cavity is shown by dashed lines through cavity legs bearing reference numerals 28, 30, 32, 34, 36 and 38 respectively. The optical path 34 of the cavity passes through LBO crystal 40, which is located at the waist of the cavity mode (nominally about 25 microns) and has its faces oriented at Brewster's angle in the preferred embodiment. For purposes of the specification, cavity leg 34 and optical path 34 share the same reference number. In an embodiment actually constructed according to the present invention, legs 28, 30, 32, 34, 36 and 38 were about 210 mm, 200 mm, 480 mm, 110 mm, 295 mm and 580 mm respectively. Those of ordinary skill in the art will appreciate that the length of leg 34 will depend on the curvature of mirrors 18 and 20. The cavity round trip time of a pulse in the pump laser should be exactly matched to the round trip time of a pulse in the OPO cavity in order for the pulse in the OPO cavity to experience gain in the LBO crystal during each round trip. This condition will be referred to herein in both the specification and the claims as the synchronous pumping condition.

Other lengths for cavity legs 28, 30, 32, 34, 36 and 38, as well as a cavity with additional mirrors, or a ring cavity could be employed so long as the beam waist at LBO crystal 40 remains small (i.e., about 25 microns) and the total cavity length satisfies the synchronous pumping condition as defined herein. As is known in the art, additional fold mirrors may be employed to fold one or more cavity legs to produce a more physically compact final product. In addition, such persons will realize that, as coating technology improves, it may become possible to provide AR coated crystal faces at normal incidence to the beam.

A high power, one-half Watt or higher pump source 42 generates subpicosecond pulses in the range of 700 to 900 nm. Suitable pump sources include, but are not limited to a cw mode-locked Ti:sapphire Nd:YAG, Nd:YLF laser, and diode pumped Li:SAF, Li:CAF or Li:SCAF lasers as more fully described later in the specification. As shown in FIG. 1(A), the pump chain uses four mirrors. Mirror 44 focuses pump beam 46 into the OPO cavity. Highly reflective mirrors 48, 50 and 52 are used to create fold legs in order to reduce the physical dimension of the system. Output beam 46 is directed by fold mirrors 48, 50, 52 and focusing mirror 44 along an optical path 54, through curved mirror 18, which is transmissive at the pump radiation wavelength in the range of from about 700 to 900 nm. An embodiment has been fabricated where the properties of a focusing element have been incorporated in the output coupler 55 of pump laser 42. Curved mirror 44 focuses pump beam 46 to a size of about 25 microns inside of LBO crystal 40.

Initial alignment is achieved with the use of certain optical elements. An iris 56 is included in leg 38 of the cavity for alignment from curved mirror 20 into output coupler 24. An iris 58 aligns the back half of the cavity from curved mirror 18 to highly reflective mirror 12, and iris 60 provides an initial alignment of pump beam 46 into LBO crystal 40.

A half-wave plate 62 is positioned along optical path 54 in order to rotate the polarization of output beam 46, permitting LBO crystal 40 to become a frequency doubling device. When half-wave plate 62 is rotated to an unpreferred polarization for pumping the OPO. It allows LBO crystal 40 to become a frequency doubling crystal. LBO crystal 40 then generates a small amount of blue light at a frequency that is twice the frequency of pump laser 42. The blue beam can then be used to align all of the mirrors in the cavity. Because each mirror is designed to have a slight bit of reflectivity in the 350 to 400 nm range (typically 80% or greater), and because the OPO is co-linearly pumped, the blue beam is a substantially collinear alignment beam for the cavity. It will be appreciated that other devices, including but not limited to the use of two mirrors, a quarter-wave plate, a device to scramble the polarization, as well as removal of the LBO crystal and insertion of a substitute, can be employed in place of half-wave plate 62 in order to generate frequency doubled light as a substantially collinear alignment beam for the cavity.

Half-wave plate 62 can be used, when the OPO is running and change the balance of colors generated in LBO crystal 40.

Output coupler 24 is mounted on a translation stage 64 such as the Low Profile Translation Stage, available from Newport Corporation, Irvine, Calif., that is driven by a motorized micrometer 66. A suitable micrometer is the Motor Mike, available from Oriel, Stratford, Conn. A computer 68, such as a Compaq 425, available from Compaq Computer, is associated with micrometer 66 and a temperature controller circuit 78.

The OPO of the present invention may be temperature tuned over a wide range of wavelengths. Accordingly, LBO crystal 40 is disposed on a thermoelectric controller 80 which may be used to vary the crystal temperature from about room temperature to about 200 degrees C. Thermoelectric controller 80 may comprise a model 01801-9C30-11A Thermo cooler, available from Thermo Electron Technologies of Waltham, Mass. A temperature sensor 82 determines the temperature of LBO crystal 40. The temperature of LBO crystal 40 can be controlled and stabilized to better than about 2 degrees C., by using feedback techniques as are well known in the art.

Figure 1B:
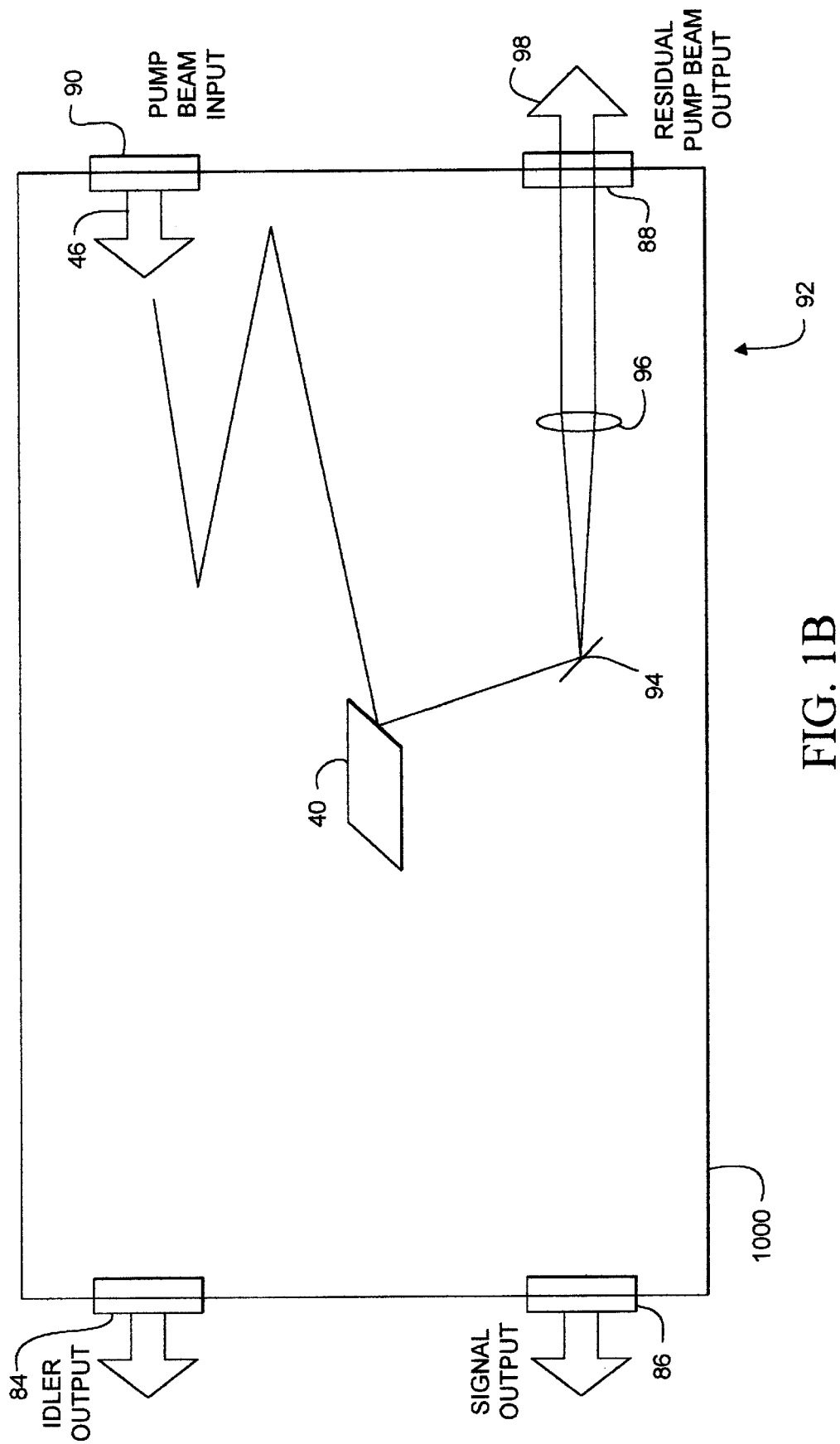
FIG. 1(B) is a block diagram of the OPO of FIG. 1(A) with three output ports.

Referring now to FIG. 1(B), the OPO can include three output ports 84, 86 and 88, and a pump beam input port 90. The head of the OPO is generally denoted as 92. When pump beam 46 is incident on a face of LBO crystal 40 that is cut at Brewster's angle, approximately 10 to 20% of incident light is reflected off and recaptured with a highly reflecting mirror 94 and a collimating lens 96. The resulting residual pump output beam 98 provides several hundred milliwatts of undisturbed pump light out of head 92. Residual pump output beam 98 has a multiplicity of uses including, (i) use as part of a pump probe experiment or (ii) mixed with the idler or signal wavelengths to generate additional frequency to produce a synchronized beam.

It has been observed by others that several different wavelengths are generated in the OPO crystal even though they are not phase matched. The present inventors have observed the second harmonic of the signal at around 550 to 650 nm, and have measured 10 mW of output and pulsewidths of less than 100 femtosecond. The present inventors have also observed sum frequency generation from the pump and the idler in the green and the pump and the signal in the blue. According to one aspect of the present invention, the intensity of these two signals can be greatly enhanced by rotating the polarization of the pump pulses by several degrees. In fact, a nearly continuous band of wavelengths can then be observed across the visible portion of the spectrum when the output coupler is replaced with a high reflector. It should be noted that all of these pulses will be well synchronized to the signal, idler and pump pulses.

Optical parametric generation is related to frequency doubling because they are both $X_2$ processes. When a subpicosecond pulse is frequency doubled, the appropriate crystal length must be chosen. There is a tradeoff between pulsewidth and efficiency. A short crystal will preserve the pulsewidth but the conversion efficiency will be low. For example, to frequency double a 100 femtosecond pulse from 800 nm to 400 nm, an LBO crystal of less than 1 mm thickness must be used or the output pulsewidth will be broadened. This broadening is due to velocity mismatch in the crystal and cannot be compensated by a prism pair.

For the above reasons, KTP crystals of only 1 mm or, at most, 1.5 mm, have been used in the subpicosecond OPO's demonstrated to date. The inventors have discovered that subpicosecond pulses can be generated in OPO's even with substantially longer crystals. According to a presently preferred embodiment of the invention, LBO crystal 40 may be between about 2 mm and 15 mm in length and is preferably between about 4 to 6 mm long, and has faces cut at Brewster's angle. Generally, longer crystals are believed to function but are not preferred because the added cost of providing large crystals does not appear to be justified by enhanced performance. The prior art has taught that crystal lengths optimized for picosecond pulses will not be suitable for femtosecond pulses.

Use of longer crystals lowers the threshold and increases the efficiency of the OPO. Using 60 femtosecond pump pulses from pump laser 42, it has been possible to generate 40 femtosecond pulses in the OPO of the present invention using LBO crystals having thicknesses of 2.2 mm, 4 mm and 6 mm. When long crystals (i.e., longer than about 4 mm) are used, the output pulses from the OPO may first be passed through a sequence of Brewster prisms. As is known in the art this sequence of prisms is used to compensate for group delay dispersion (GDD). The inventors have found that, unlike a single pass through a frequency doubling crystal, the output pulses from the OPO with a thick crystal are substantially linearly chirped. Thus the prism sequence is able to compress the pulses, a result not contemplated by the prior art.

At those wavelengths where the GDD is negative in the OPO, the chirp on the pulse will be negative. This will also be true for idler pulses when the signal pulse has a positive chirp (since the signal and idler will always have chirps of opposite sign). In this case, the prism pair can be adjusted to give positive GDD by inserting the tips of the prisms sufficiently into the beam. Those of ordinary skill in the art will appreciate that a piece of glass, such as SF-10, can be used instead of the prism sequence in this case.

This same discovery can be applied to subpicosecond pulse generation from OPO's using only picosecond pump pulses. Output pulses of 3 picoseconds have been generated using 4 picosecond pump pulses at 532 nm and a 6 mm LBO crystal. When these output pulses were passed through a prism sequence, 200 femtosecond pulses were generated. The inventors believe that the generation of these linearly chirped pulses is due to the GDD in the crystal and cavity and the requirement of satisfying the synchronous pumping condition.

Figure 2:
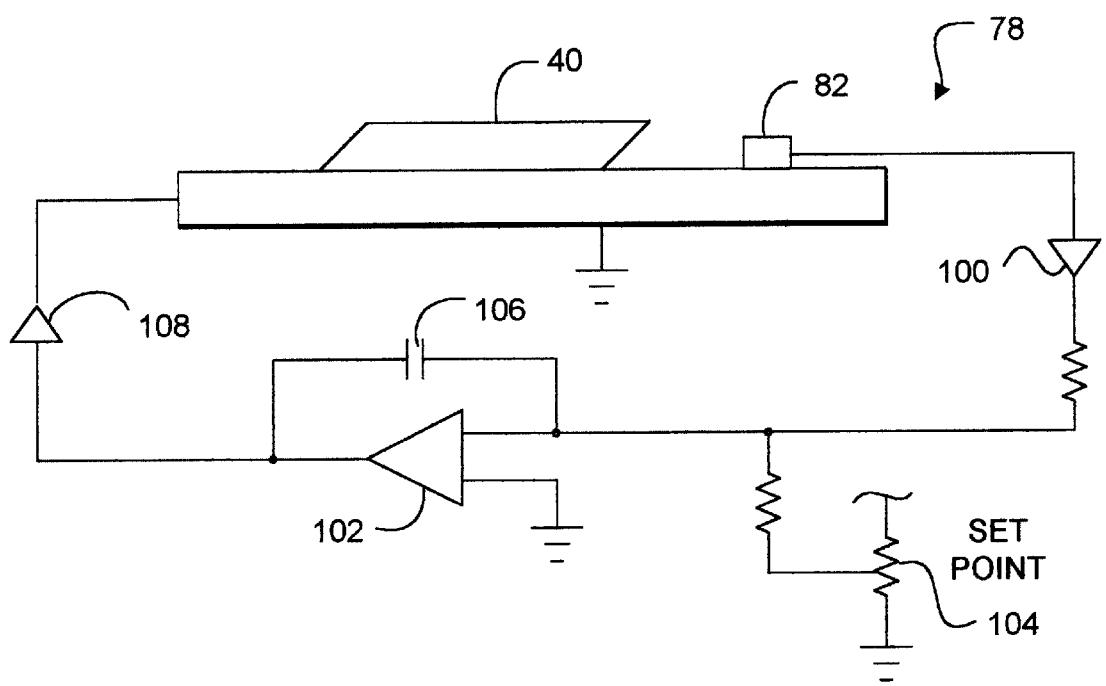
FIG. 2 is a block diagram of a typical temperature feedback arrangement useful to control the temperature of the LBO crystal in the OPO of the present invention.

A typical controller circuit 78 useful for the OPO of the present invention is shown in block diagram form in FIG. 2. A temperature sensor 82 is disposed adjacent to crystal 40 on thermoelectric controller 80 and is connected to temperature controller circuit 78. as can be seen in FIG. 2, temperature controller circuit 78 comprises an amplifier 100 coupled to the output of temperature sensor 82. The DC output signal from amplifier 100 is combined in amplifier 102 with a DC setpoint signal from potentiometer 104 (alternatively a DAC could be used), used to select an operating temperature. Capacitor 106 is used to provide loop gain compensation. The output signal from amplifier 106 is fed to driver amplifier 108, which controls the amount of heat generated by thermoelectric controller 80. Computer 68 controls the temperature by establishing the set point signal 104.

Computer 68 includes a CPU coupled through a system bus. On this system bus are a keyboard, a disk drive, or other non-volatile memory systems, a display, and other peripherals, as known in the art. Also coupled to the bus are a program memory and a data memory.

Mode-locked Ti:sapphire lasers operate from 700 nm to 1100 nm. The second harmonic of these lasers extends from 350 nm to 550 nm. Those of ordinary skill in the art will appreciate that there is a band of output wavelengths between 550 and 700 nm which is not covered if the fundamental and second harmonic of the pump laser is employed.

If the LBO OPO is extended down to a wavelength of 1.1 microns then the second harmonic of the OPO is able to fill this gap. The output wavelength range of the OPO of the present invention may be extended down to about 1.1 microns by raising the temperature of crystal 40 to as high as about 450 degrees C. However, those of ordinary skill in the art will realize that thermoelectric controller 80 cannot withstand such high temperatures and that an oven may be employed in its place in such embodiments.

Figure 3:
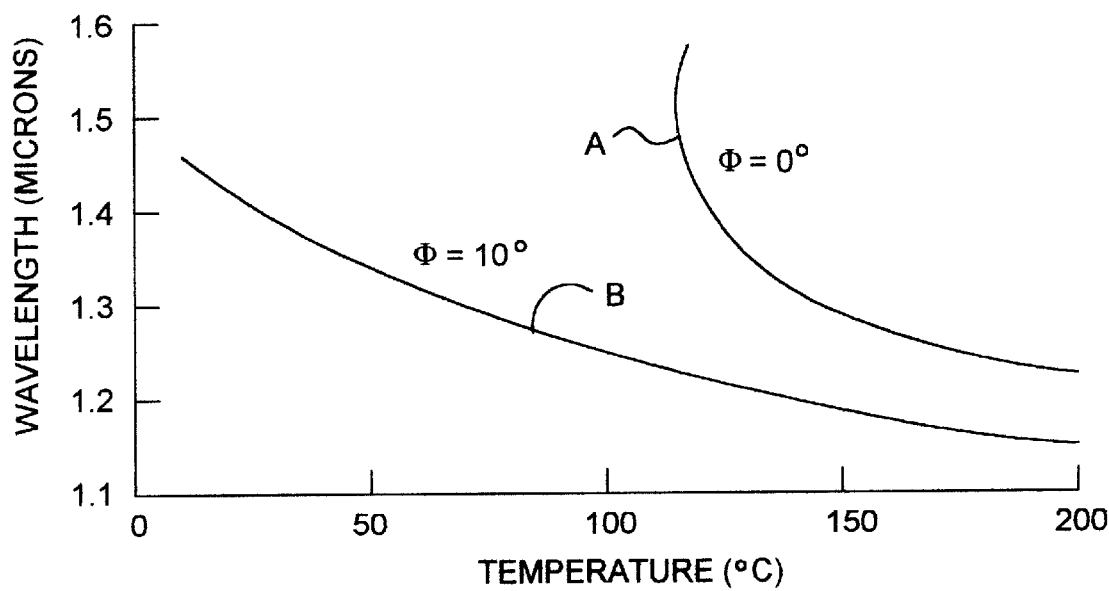
FIG. 3 is a graph showing the dependence of output wavelength on temperature of the OPO of the present invention for two different orientations of the angle $\phi$ in the LBO crystal.

Another method for extending the output wavelength range of the OPO of the present invention discovered by the inventors is to tilt LBO crystal 40 slightly prior to polishing the Brewster faces. A 90 degree phase matched LBO crystal (also referred to as noncritical phase matching) is always cut at $\theta=90$ and $\phi=0$. The phase matching curve for this crystal pumped at a wavelength of 760 nm is shown in curve A of FIG. 3. If instead the crystal is cut at $\theta=90$ and $\phi=10$ degrees, the phase matching temperatures shift as shown in curve B of FIG. 3. As is shown, the tuning range of this system will extend down to 1.1 microns. For example, the present inventors have demonstrated that a crystal cut of $\theta=90$ and $\phi=10$ degrees, when pumped at a wavelength of 750 microns, will produce output pulses at a wavelength of 1.12 microns at a temperature of 165 degrees C. This technique of using a 90 degree phase matched crystal and tilting away from 0 degrees to broaden the tuning range can, of course, be applied to other crystals, such as KTP.

One goal of the present invention is to provide an OPO which is capable of producing subpicosecond pulses over the wavelength range from 1.1 microns to beyond 2.6 microns. The wavelength at which the OPO runs is determined by the pump wavelength, the temperature of the crystal and to a lesser extend the cavity length of the OPO. The present inventors have modified the temperature coefficients of Lin et al. to obtain a more accurate match to experimental data.

Figure 4:
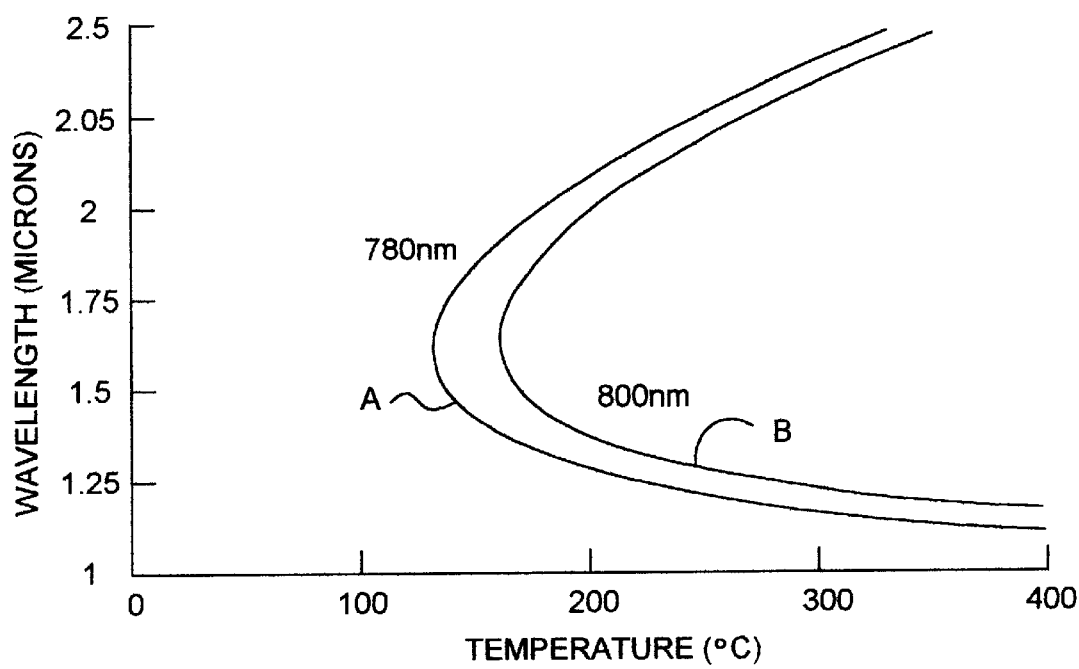
FIG. 4 is a graph showing the dependence of output wavelength on temperature of the OPO of the present invention for two different pump wavelengths.

Referring now to FIG. 4, the dependence of output wavelength on temperature is shown. For a pump wavelength of 780 nm, the phase matching curve shown in curve A of FIG. 4 is obtained. If the laser is tuned to 800 nm, curve B of FIG. 4 is obtained. It is important to note that the slope of the curve varies and even becomes infinite at one point. This point is called the degeneracy point and always corresponds to a wavelength that is twice the pump wavelength. Thus the accuracy with which the temperature must be set depends on what wavelength it is desired to generate.

Figure 5:
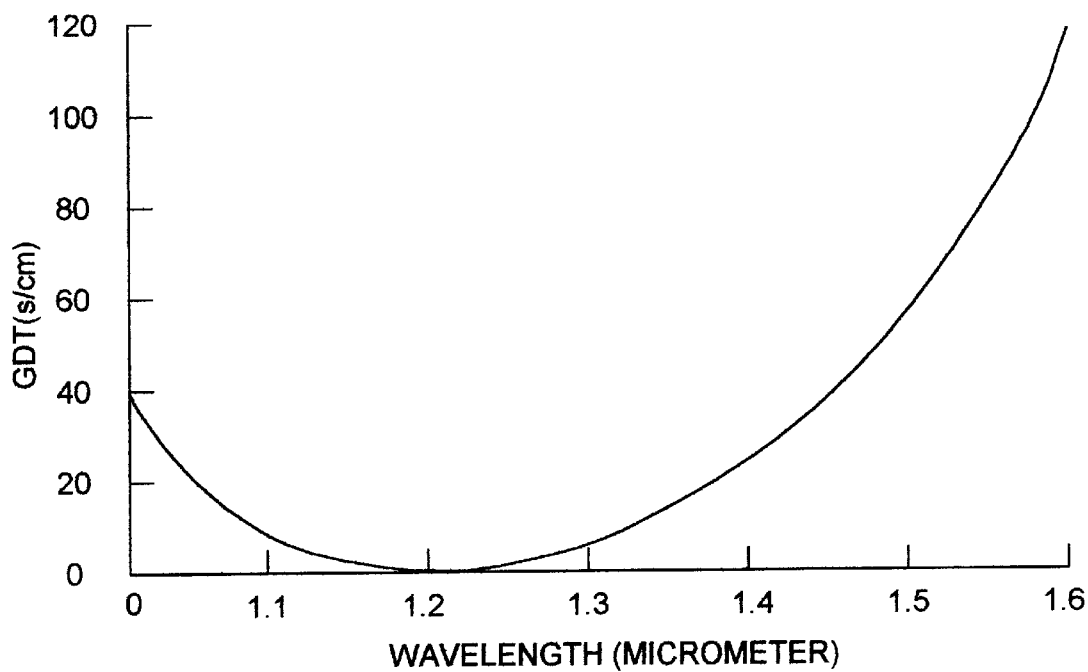
FIG. 5 is a graph showing the approximate group delay time of an LBO crystal as a function of wavelength.

For a given pump wavelength and temperature a band of wavelengths can still operate. Typically, a wavelength within at least 30 nm of the central wavelength predicated by curves A and B of FIG. 4 can still oscillate. Which portion of this band will oscillate is determined by the synchronous pumping condition. When the pulse travels through the cavity it experiences group delay dispersion (GDD), that is the different wavelengths take a different time to make a round trip in the cavity. Most of the GDD comes from the crystal itself. The approximate group delay time of LBO crystal 40 is shown in FIG. 5. The GDD is then the slope of this curve. Only those wavelengths that satisfy the synchronous pumping condition will oscillate; that is, only those wavelengths that make a round trip in the cavity and return during the 100 femtosecond pump pulse will experience gain. By adjusting the OPO cavity length the OPO can be tuned over tens of nanometers. The sensitivity of the central wavelength to variations in cavity length will depend on the wavelength chosen. Those of ordinary skill in the art will note that, in the region of about 1.2 to 1.3 microns, the GDD becomes zero and the sensitivity to cavity length changes becomes a maximum. This zero GDD point can be moved by inserting other materials into the cavity or by using a prism pair for intra-cavity dispersion compensation, as more fully described hereafter.

According to the present invention, the cavity length of the OPO is servo controlled to keep the OPO cavity and the pump laser cavity at the same length. This is important for generation of pulses having durations less than 100 femtoseconds and for long-term stability.

Figure 6:
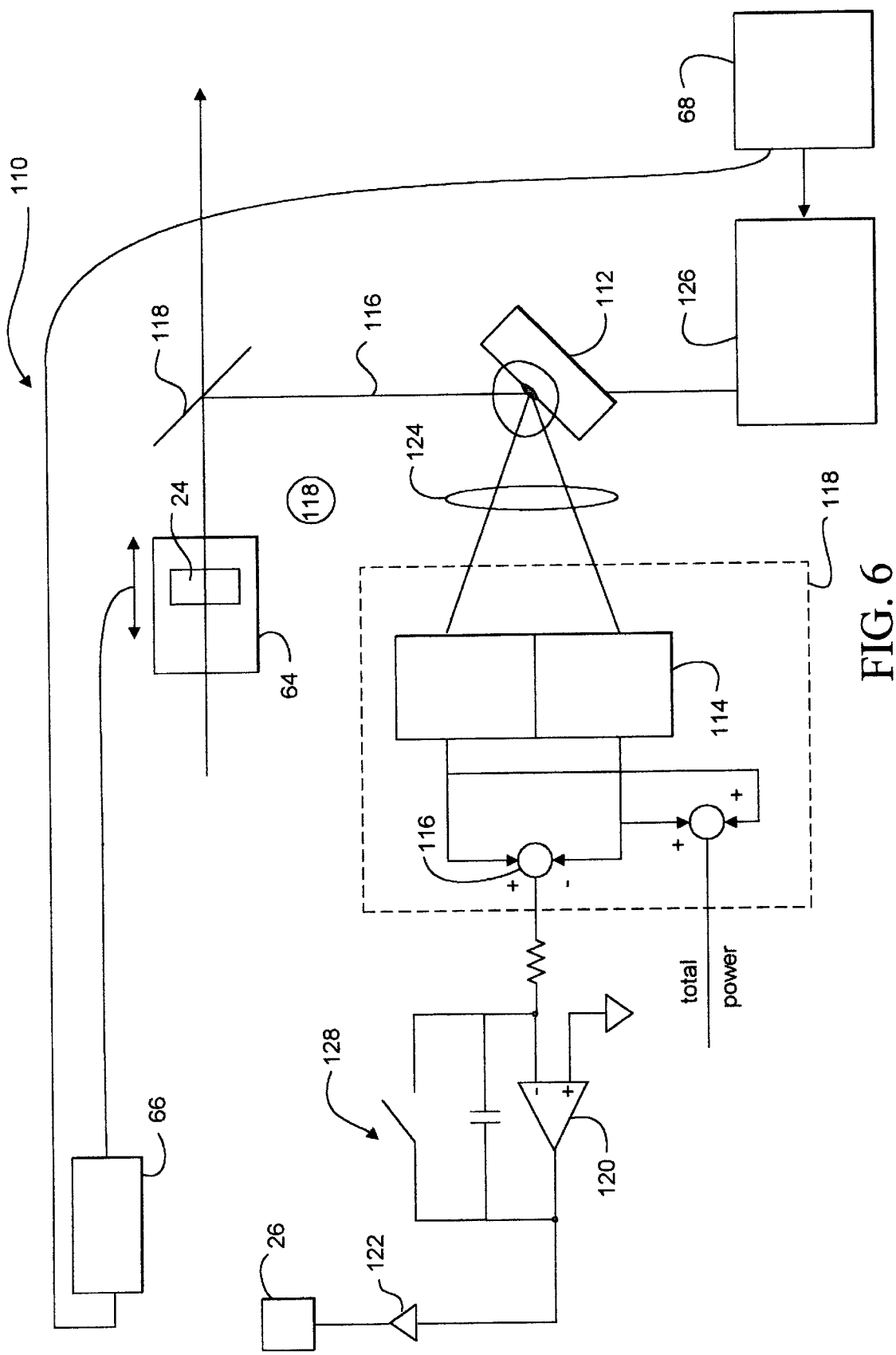
FIG. 6 is a block diagram of a cavity-length servo control for the OPO of the present invention.

Referring now to FIG. 6, a cavity-length servo system 110 includes diffraction grating 112 and a device for splitting the wavelength, including but not limited to a 256 element array, a four segment linear array or a quad or bi-cell 114. For purposes of this disclosure, device 114 will be referred to as a bi-cell detector but it will be appreciated that the present invention is not limited to only such a device. A portion 116 of the OPO output signal is directed to diffraction grating 112 by a beam splitter 118. Diffraction grating 112 is set at an angle to select the desired wavelength. The spread out portion of the spectrum containing the OPO output frequency at its center is projected on bi-cell detector 114. The signals from the two halves of bi-cell detector 114 are subtracted from one another in subtractor circuit 116. Bi-cell detector 114 and subtractor circuit 116 in combination constitute a centering device 118. If the wavelength is centered a 0 signal is provided by centering device 118. Centering device 118 provides an error signal corresponding to the displacement of the actual wavelength relative to the desired operating wavelength. The error signal generated by centering device 118 is amplified by amplifier 120, used to drive a servo amplifier 122 which in turn drives piezoelectric transducer 26. The servo loop acts to minimize the error signal, thus centering the desired wavelength on bi-cell detector 114. A focusing lens 124 may be positioned between diffraction grating 112 and bi-cell 114. Diffraction grating 112 is mounted on a rotation device 126, including but not limited to a stepper motor, galvanometer and the like.

Figure 7:
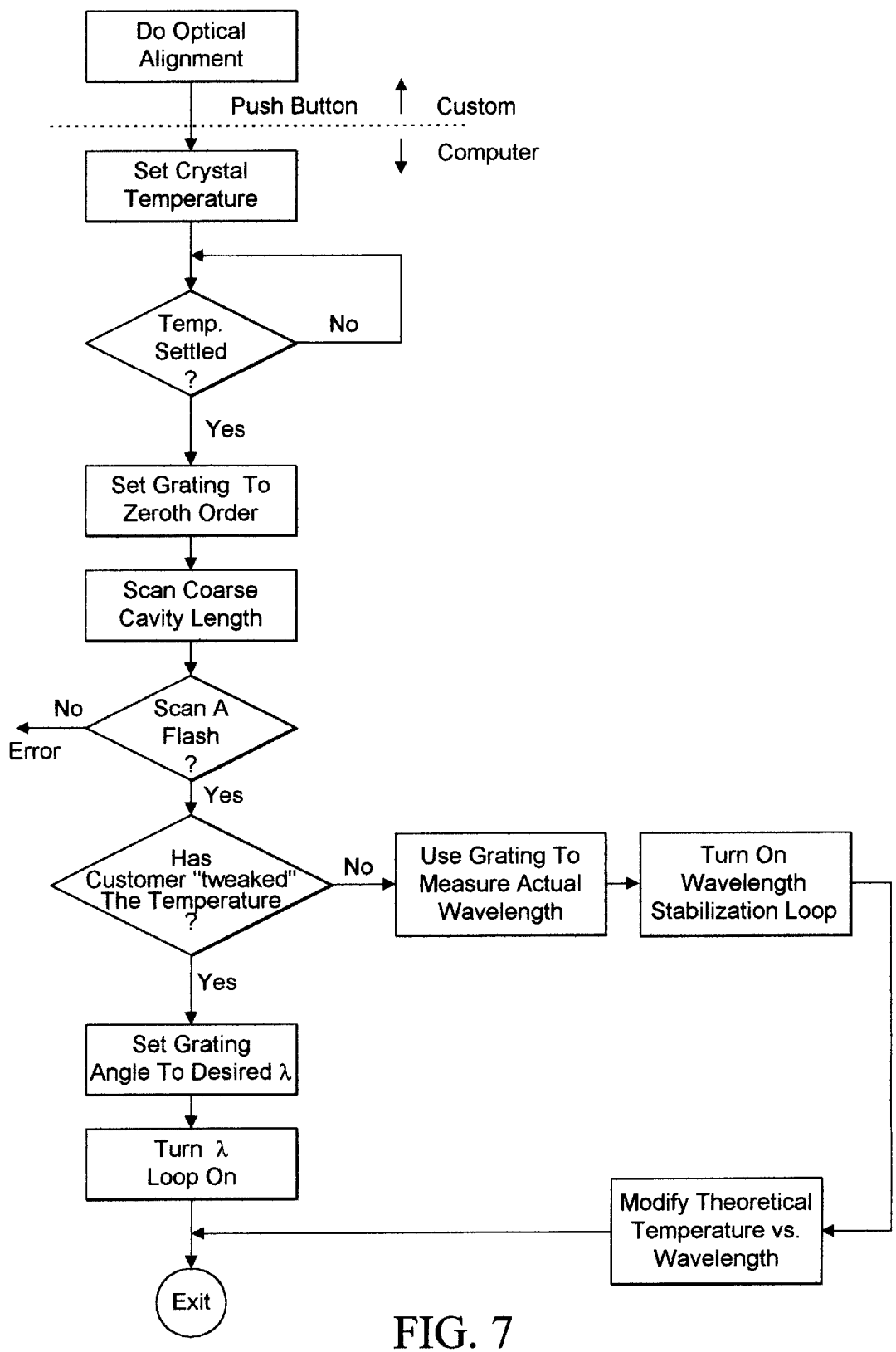
FIG. 7 is a flow chart illustrating computer controlled operation of the OPO of FIG. 1(A).

Piezoelectric transducer 26, micrometer 66, thermoelectric controller 80 and rotation device 126 are all connected to computer 68. The combination of hardware and software (collectively "resources") permits computer 68 to control, (i) cavity coarse length, by moving output coupler 24, in order to obtain the synchronous pumping condition, (ii) LBO crystal 40 temperature for phase matching, (iii) the grating angle by rotating diffraction grating 112 in order to monitor the wavelength and (iv) the on/off of the fine cavity length's servo to hold the wavelength constant. FIG. 7 is a flow chart of the operation of computer 68. The operator of the OPO selects a desired operating wavelength and activates the "scan length" function. Computer 68 sets the temperature of LBO crystal 40, waits for it to settle, and then rotates diffraction grating 112, through galvanometer 126, so that "zeroth order" hits bi-cell detector 114. With the grating in this position, centering device 118 is not sensitive to wavelength. Computer 68 then scans the coarse cavity length control, looking for a "flash". It then stops the coarse length scan. Diffraction grating 112 is then wiggled to make the zeroth order beam change from side to side or up and down. The zero crossing is used to verify and partially validate the grating angle. Diffraction grating 112 is then rotated to "1st order" so that centering device 118 is sensitive to wavelength. The actual operating wavelength is measured. Finally switch 128 (FIG. 6) is opened, turning on the wavelength servo.

It will be appreciated that with the present invention it is not required to go to the zeroth order. The zeroth order may be preferred because a flash is always observed, even if the temperature is such that the laser runs at a wavelength different than what the operator desires. Servo system 110 can use 2nd, 3rd, . . . orders of diffraction grating 112. Servo system 110 can employ a prism, or any other wavelength dispersive element. Once servo system 110 is locked, the operator changes wavelength merely by selecting another wavelength. Computer 68 then automatically adjusts the grating angle of diffraction grating 112, temperature of LBO crystal 40 and the cavity length, as required. The desired temperature of LBO crystal 40 may not be known exactly. The present invention permits the operator of the OPO to tweak the temperature for optimum performance. Additionally, computer 68 automatically scans for different wavelengths.

Appendix A provides a source code listing of the full scan function.

The operator of the OPO activates a button on computer 68 which then begins the sequencing. First the cavity is aligned using frequency doubled light. Pump laser 42 is rotated to the preferred orientation for pumping the OPO. Output coupler 24 is set to a relative position that will, over a translation range, cover errors that may have occurred during the physical measurement of the cavity. A scan button is then depressed, after alignment of the OPO with the blue light, and computer 68 translates translation stage 64 through its range by motorized micrometer 66. When the cavity length matches the pump laser's cavity length, the OPO will flash. Computer 68 sees that flash, stops motor micrometer 66, and through a sequence of events performs a calibration. It then turns on servo system 110.

The wavelength remains fixed both over the short and long terms. After the operator enters the desired wavelength, the OPO goes to that wavelength. Course cavity length is controlled as is the temperature of the LBO crystal 40. The correct cavity length is found by searching for the one that produces the synchronous pumping condition. The present invention also diagnoses the actual operating wavelength of the OPO.

When initiating the OPO, it may not be operating at the desired wavelength. The ability to self diagnose is possible with computer 68.

Setting the operating wavelength can be automated. The OPO is able to go to a sequence of different wavelengths and pause at each one in a scanning regime. It goes to one wavelength, waits, moves to another wavelength, and goes through a sequence. It then goes back and repeats the process.

Unlike a laser system which can be aligned using the fluorescence from the pumped gain media to align the cavity, the level of optical parametric fluorescence is many orders of magnitude smaller. To compound the alignment difficulty, the length of the OPO cavity must match the pump laser cavity length to within a few microns or the OPO will not oscillate. The alignment procedure for the prior art angle tuned KTP OPO involves first bringing the pump beam into the nonlinear crystal at 5 degrees off axis (due to the walkoff), followed by prealigning the cavity with a 1.3 $\mu$m laser diode, and then looking for the fluorescence with a cooled germanium detector and a lock-in amplifier.

The alignment procedure for 90 degree phase matched LBO in the OPO of the present invention is far simpler. The optical cavity length of the pump laser 42 can be determined using a detector and frequency counter and the optical cavity length of the OPO may be physically set to the same value to an accuracy of typically about 1 mm. LBO crystal 40 is then aligned at Brewster's angle by rotating the polarization of the pump beam by 90 degrees and looking for the minimum reflected power from the crystal surfaces. When the pump beam is in this polarization, it geneterates frequency doubled blue light. This frequency doubled beam can be used to align the OPO cavity. OPO optics 12, 14, 16, 18, 20, 22 and 24 are designed to reflect this blue beam. The beam is directed from curved mirror 20, to highly reflective mirror 22, through iris 56 and on to output coupler 24. The beam reflected from output coupler 24 is aligned back through iris 56. At this time, the beam is now on curved mirror 18. Using adjustment controls on curved mirror 18 the beam is directed through iris 58 and onto highly reflective mirrors 16, 14 and 12. The beam from highly reflective mirror 12 is aligned back through iris 58. Since there is no walkoff in the 90 degree phase matched LBO, pump beam, the frequency doubled beam, and the OPO beam will be substantially collinear. Waveplate 62 is either rotated 90 degrees or removed from pump beam 46. Finally, the length of the cavity is varied slightly to get an exact match to pump laser 42. Another variation of this alignment procedure is to design OPO cavity mirrors 12, 14, 16, 20, 22 and 24 to be reflective at the pump wavelength, while allowing reflector 18 to be highly transmissive at the pump laser wavelength.

According to an alternate alignment procedure, a Nd:YAG crystal is first substituted for LBO crystal 40. If a Brewster cut LBO crystal is used, the Nd:YAG crystal is also Brewster cut. The optimal thickness for the Nd:YAG crystal is such that the beam is displaced the same distance laterally as in the LBO crystal as shown in FIG. 1(A). The cavity is then aligned and the Nd:YAG is made to lase. The cavity length is determined by examining the output of this cavity on a diode and spectrum analyzer. The noise will show a beat at a frequency of C/2L, where C is the speed of light and L is the cavity length. The true optical cavity length may be determined to within a few microns. Cavity length of pump laser 42 may also be determined with the diode and spectrum analyzer, and the two cavities can then be accurately matched. Iris 60 is placed on pump beam 46 for later reference, as shown in FIG. 1(A). The Nd:YAG crystal is then replaced by LBO crystal 40, which is aligned so that pump beam 46 passes through both iris's 56 and 58. Finally, mirrors 16 and 24 are aligned to pass pump beam 46 back through iris's 56 and 58 respectively.

It has been found by the present inventors that the GDD of LBO crosses zero at about 1.2 $\mu$m. As previously noted, the group delay time as a function of wavelength is shown in FIG. 5. The calculated value for zero GDD is shown as 1.19 $\mu$m. This is the lowest wavelength of any suitable nonlinear crystal. As a result, clean ultra-short pulses can be produced near this wavelength in the LBO OPO even without prisms. Pulses as short as 40 femtosecond, with typical pulse widths of 60 femtosecond have been observed at a wavelength of 1.3 micrometers. The shortest pulses observed with a KTP OPO at the same wavelength are 57 femtosecond with prisms in the cavity. As the LBO OPO is tuned to longer wavelengths, such as 1.5 $\mu$m, the GDD becomes more negative and the pulses broaden. For example, the inventors have found that, at a wavelength of 1.48 microns, the pulsewidth broadens to 100 femtoseconds. Other materials such as the glass SF-10, have their zero GDD wavelength at wavelengths as long as 1.7 $\mu$m. By inserting a compensating plate of SF-10 of a few mm thickness in the cavity, the GDD in the OPO may be reduced to an arbitrarily small value. The total GDD will just be the sum of the GDD of the crystal and the compensator plate. The required small negative GDD value can be obtained in the region between 1.3 and 1.7 $\mu$m using this technique and avoiding the complication of a prism pair. For wavelengths shorter than 1.3 micrometers, intra-cavity prism pairs can be employed. For example, the inventors have found that, at a wavelength of 1.48 microns, the pulsewidth can be reduced to 53 femtoseconds using a 6 mm plate of SF-10.

To obtain the shortest pulses from the OPO, the group delay dispersion must be controlled. The optimal group delay dispersion (GDD) is zero or slightly negative to compensate self phase modulation (SPM) in the crystal. For the KTP OPO, this negative dispersion is generated by placing a pair of prisms in the cavity, as is well known in the art. This adds complexity to the OPO and as the laser is tuned, the dispersion must be adjusted and then the cavity length must be readjusted. This optimization must be done every time the OPO is tuned. If the prisms are omitted, the pulse width will broaden significantly, and the pulse quality will suffer. This procedure is, at best, cumbersome.

Figure 1C:
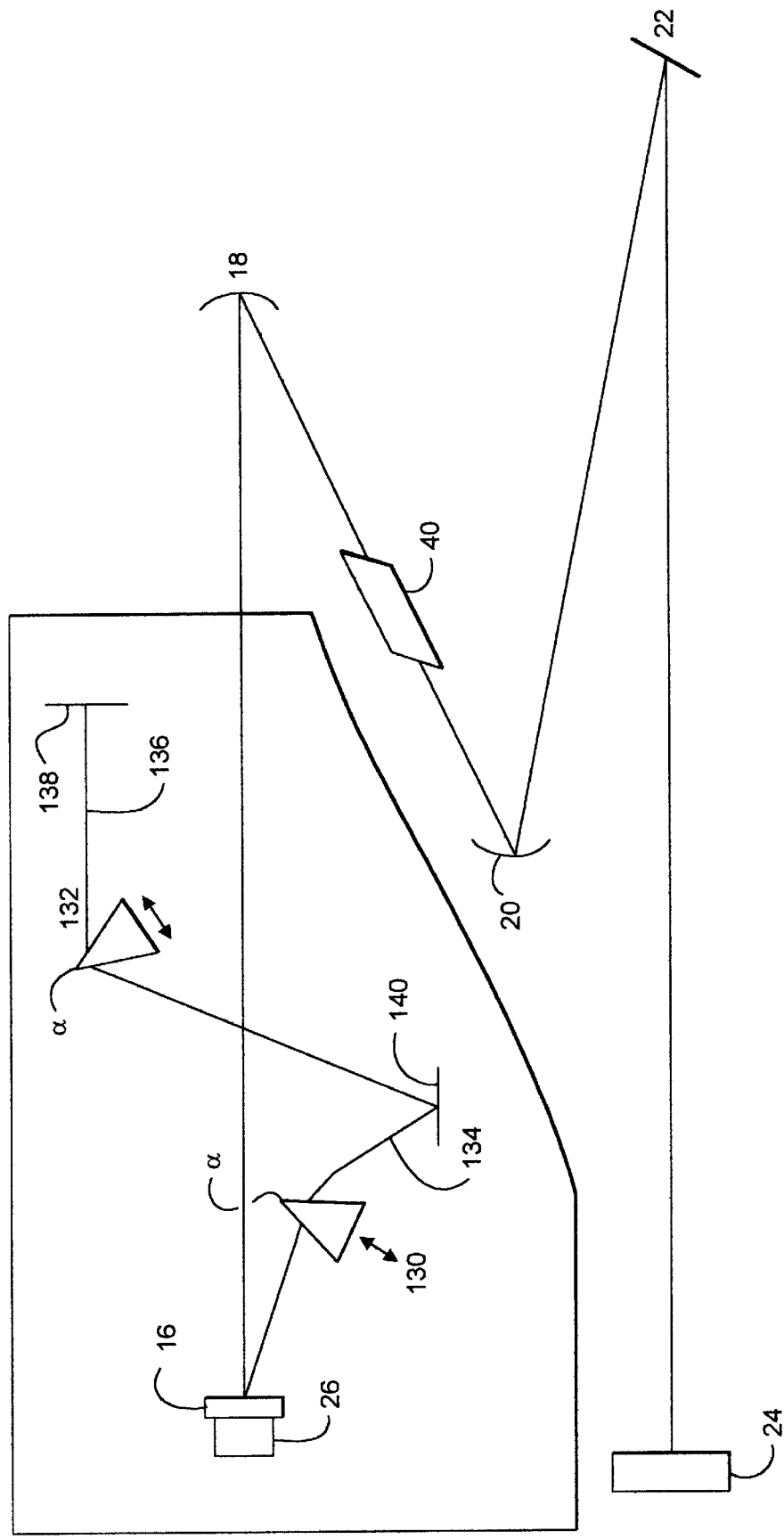
FIG. 1(C) is a block diagram of an intra-cavity prism pair used to adjust the dispersion without changing the cavity length.

The present invention provides for the optional inclusion of a prism pair. Referring now to FIG. 1(C), two prisms 130 and 132 are provided, each having an apex angle $\alpha$. Prism 130 moves in a direction that is parallel to the bisection of apex angle $\alpha$. As beam 134 enters prism 130 at Brewster's angle, prism 130 does not move beam 134 in direction and position, but does change the optical cavity length. Prism 132 moves in a direction that is perpendicular to the bisection of apex angle $\alpha$. Prism 132 moves the position but not the direction of beam 136. Therefore, highly reflective mirror 138 must be flat. Prism 132 does not change the optical path length. A fold mirror 140 is included and is highly reflective.

In the prior art, all prisms are translated the way prism 130 is translated, along its bisection of the apex. Prism 132 is translated in order to vary the dispersion but without changing the cavity length. Prism 130 provides coarse adjustment of the dispersion, and determines whether the two prisms are included in the cavity or not. Prism 132 adjusts the dispersion without changing the cavity length, and provides fine adjustment when the servo is already locked.

According to another aspect of the present invention, highly reflective mirror 12 or 138 is replaced by a Littrow prism. The front face of the prism is a Brewster surface, and the rear face is coated as a high reflector. When the prism is translated parallel to its high reflecting face, the amount of glass inserted into the beam path is varied while maintaining the overall cavity length.

The synchronously pumped subpicosecond OPO is similar to a synchronously pumped dye laser in many ways. As such, many of the enhancements added to the dye laser systems are also applicable to the OPO's. Most notable is the cavity dumper. Using an acousto-optic modulator similar to those designed for dye lasers, the repetition rate of the OPO can be reduced and the output pulse energy can be increased by more than an order of magnitude. In addition both intra-cavity and extracavity frequency doubling and difference frequency mixing are possible.

In addition, the inventors have observed that the OPO does not tune between the wavelengths of 1.35 and 1.42 microns. Furthermore, the output power is greatly reduced between the wavelengths of 1.1 and 1.2 microns. The inventors have found that the cause of this tuning discontinuity is absorption due to water in the atmosphere. By sealing and purging the cavity using conventional purging and sealing techniques, it has been demonstrated that a 50% increase in power may be obtained in the region between the wavelengths of 1.1 and 1.2 microns. The inventors have found that the OPO can be made to operate throughout the entire wavelength range of 1.35 to 1.42 microns.

According to a second embodiment of the present invention, a picosecond mode-locked Ti:sapphire laser is used as the pump source for the OPO described herein. The present inventors have discover that, using 2.6 watts at 770 nm pump pulses having durations between about 1 and 2 picoseconds, picosecond output pulses at a power of 300 mW are generated. The temperature tuned LBO crystal used was 6 mm in length as previously described herein.

According to a third embodiment of the present invention, which is a variation of the preferred embodiment herein, a cw mode-locked Nd:YAG or Nd:YLF laser, preferably diode pumped, is used as the pump source. This laser is frequency doubled to provide pump pulses at 532 or 524 nm. These pump sources are robust and compact, but always produce pulses larger than 1 picosecond. Such a source was used by A. Robertson et al. and produced 2.8 picosecond green pump pulses. Robertson et al. pumped a temperature tuned LBO OPO but did not measure the output pulse duration. The authors assume that they have generated picosecond pulses and teach that the use of shorter pump pulses generated through pulse compression should also enable the continuous generation of broadly tunable femtosecond pulses.

The present inventors have discover that, using 4 picosecond pump pulses at 532 nm, 3 picosecond signal pulses near 800 nm may be generated from an LBO OPO using a 6 mm crystal. Due to the dispersion of the crystal and the synchronous pumping condition, these pulses are substantially linearly chirped. Using an extracavity prism pair these 3 picosecond pulses are compressed to 200 femotosecond. A prism pair inserted into the cavity reduces the positive GDD and the bandwidth of the 3 picosecond pulses is substantially increased. The sensitivity to cavity length fluctuations, however, become quite severe. It is anticipated that pulses substantially shorter than 200 femtosecond can be generated.

The concept of generating subpicosecond pulses from an OPO pumped by picosecond pulses is novel. In all OPO's to date the output pulse has been comparable to the pump pulse or longer in duration. The only exception was R. Laener et al. Opt. Lett. 15, 971 (1990), who used 800 femtosecond Q-switched mode locked pump pulses and generated 60 femtosecond output pulses. These pulses were only generated at a single wavelength and were idler pulses not signal pulses. The authors of this prior art article did not appreciate how to extend these short pulses to other wavelengths or to the signal pulses. They did not suggest using intra or extra cavity dispersion compensation. They attributed the result to a fortuitous combination of crystal dispersion and signal and idler wavelengths.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

APPENDIX A

Copyright Spectra-Physics Lasers, 1994

SOURCE CODE FOR THE FULL SCAN FUNCTION

SEE APPENDIX PAGES A-1 THROUGH A-3.

```
10/27/98  16:35   WILSON SONSINI → 7033086642                          NO.527  P003
int ScanLength(void)
{
        ButtonRec b={"","","","","","","","","","Abort","Scan"};
        float orig_mpct;
        int state=SCAN_FWD_SMALL;
        int done=0;
        float tmp;
        char *fwd_msg    ="Scanning forward..           ";
        char *rev_msg    ="Scanning reverse..           ";
        char *give_up_msg="No flash; back to start..    ";
        struct MovingBarStruct dot={HORIZ_DOT,30,22,175,5,-1,0.0};
        float gvolts;
        float rminl,rminlv;
        float speed;
        float last_pwr;
        int err_dir;
        float SpeedRatio;

SpeedRatio = OpticsSetParms[OpticsSet].ScanSpeedGain;

SetViewFullScreen;
        clearviewport();
        settextjustify(LEFT_TEXT,TOP_TEXT);
        settextxy(0,0,"SCANNING COARSE LENGTH");
        gprintxy(0,10,"%s",fwd_msg);
        DispButtons(b);

orig_mpct=GetMotorFraction;
        DigOutputs.LoopOn=0;
        SetLoopCtrl(DigOutputs.LoopOn);

while (!done) {
                dot.fraction=GetMotorFraction;
                MovingBar(&dot);

last_pwr=AvgReadings(10,TOTAL_PWR);
                if (last_pwr> PowerThreshold) { /* saw a flash! */
                        done=1;
                } else {
                  switch (state) {
                        case SCAN_FWD_SMALL:
                                if ( (GetMotorFraction-orig_mpct) > FRAC_TO_MOVE
                                        || (CheckMotorLimits()==FWD)
                                ) {
                                        gprintxy(0,10,"%s",rev_msg);
                                        state=SCAN_REV_SMALL;
                                        SetMotorSpeed(-2.5*SpeedRatio);
                                } else {
                                        SetMotorSpeed(2.5*SpeedRatio);
                                };
                                break;
                        case SCAN_REV_SMALL:
                                if ( (GetMotorFraction-orig_mpct) < -FRAC_TO_MOVE
                                        || (CheckMotorLimits()==REV)
                                ) {
                                        gprintxy(0,10,"%s",give_up_msg);
                                        state=BACK_TO_START;
                                        SetMotorSpeed(+2.5*SpeedRatio);
                                };
                                break;
                        case BACK_TO_START:
                                if ( fabs(GetMotorFraction-orig_mpct) < 0.005) {
                                        state=NO_FLASH;
```

A-1

```
                                    SetMotorSpeed(0);
                                    done=1;
                            };
                            break;
                    case SCAN_PAST_FWD_FLASH:
                            if (last_pwr < 0.05) {/* .05 gives hysterisis ;
threshold */
                                    state=SCAN_REV_SMALL;
                                    SetMotorSpeed(-0.5*SpeedRatio);
                            } else {
                                    SetMotorSpeed(0.5*SpeedRatio);
                            };
                            break;
                    };
                    if (mygetch() == 's') {
                            SetMotorSpeed(0);
                            state=NO_FLASH;
                            done=1;
                    };
            };

SetMotorSpeed(0);
            if (state==NO_FLASH) return 0;
                                    else return 1;
    }
    int FullScanLength(void)
    {
            float now_pwr,last_pwr;
            float vone;
            int retval;
            char *GZmsg="Setting grating angle           ";
            char *CWmsg="Checking wavelength calibration";
            char *MWmsg="Measuring wavelength            ";
            float toff;

if (CheckAndAdjustTemperature()) return 0;

gprintxy(0,35,"%s",GZmsg);
            StepTo(StepAtZerothOrder);

last_pwr=ReadPower();
            if ( (last_pwr< PowerThreshold) || (MotorPolarity==0) ) {
                    DetermineMotorPolarity();
            };

if ( ScanLength() ) { gprintxy(0,35,"%s",CWmsg);
                    FindZerothOrder();

if (TTable.use_table==0) {
                            gprintxy(0,35,"%s",MWmsg);
                            FindSignalFirstOrder();
                            CurLambda=StepCnt2Wavelength(CurStep);
                            DigOutputs.LoopOn=1;
                            SetLoopCtrl(DigOutputs.LoopOn);

/* Estimate actual temperature offset, based on the temperature
                                    of the goal wavelength (the temp we're already at) and
                                    the temperature of the actual wavelength.
                            */
                            toff = AnalogOutputs.Temp - CalcTemp(CurLambda/10000.0,PumpLambda/
10000.0);
                            FillTTable(toff);
```

A-2

```
                    {
        /* set desired wavelength on the grating & lock there */
        SetGratingAngle(GoalLambda);
        delay(40);
        DigOutputs.LoopOn=1;
        SetLoopCtrl(DigOutputs.LoopOn);
    };

/* round GoalLambda to nearest 10 nm = 100 angstroms
           Not preserving the original goal prevents massive wavel
           hunting, which may put the laser out before the customer
           can optimize the temperature or laser alignment.
        */
        GoalLambda=RoundWL(GoalLambda);
    } else {
        retval=1;

SetViewFullScreen; clearviewport();
        outtextxy(0,8,"Scan was not successful");
        outtextxy(0,20,"Try full alignment");
        outtextxy(0,50,"(any key to continue)");
        while (mygetch()==NOCHAR);
        retval=0;
    };
    return retval;
}
```

A-3

What is claimed is:

1. A synchronously pumped, optical parametric oscillator, comprising:
   a cavity with an optical path therethrough;
   an LBO crystal disposed in said optical path in said cavity at a beam waist position thereof;
   a high power pump source generating subpicosecond pulses in the range of 700 to 900 nm, oriented to supply pump pulses to said LBO crystal;
   said cavity having a length selected to produce a synchronous pumping condition; and
   a temperature controlling device to control the temperature of said LBO crystal to within at least about 2 degrees C.

2. The synchronously pumped, optical parametric oscillator of claim 1, further including resources to tune the optical parametric oscillator to a desired wavelength.

3. The synchronously pumped, optical parametric oscillator of claim 2, wherein the resources maintain the desired wavelength after it has been tuned.

4. The synchronously pumped, optical parametric oscillator of claim 1, wherein the crystal has a length of between about 2 mm and 15 mm.

5. The synchronously pumped, optical parametric oscillator of claim 1, wherein the crystal has a length of between about 4 mm and 6 mm.

6. The synchronously pumped, optical parametric oscillator of claim 1, wherein opposing faces of the crystal in the optical path are cut at Brewster's angle.

7. The synchronously pumped, optical parametric oscillator of claim 1, wherein the LBO crystal is cut for non-critical phase matching.

8. The synchronously pumped, optical parametric oscillator of claim 1, wherein the cavity includes an end mirror, and the end mirror is positioned on a translation stage.

9. The synchronously pumped, optical parametric oscillator of claim 1, wherein the pump source is a Ti:sapphire laser.

10. A synchronously pumped, optical parametric oscillator, comprising:
    a cavity with an optical path therethrough;
    an LBO crystal disposed in said optical path in said cavity at a beam waist position thereof;
    a high power pump source generating subpicosecond pulses in the range of 700 to 900 nm, oriented to supply pump pulses to said LBO crystal;
    said cavity having a length selected to produce a synchronous pumping condition;
    a temperature controlling device to control the temperature of said LBO crystal to within at least about 2 degrees C.; and
    resources to repetitively scan an oscillator output through a series of desired wavelengths.

11. The synchronously pumped, optical parametric oscillator of claim 10, wherein the resources scan to and remain at a series of specified wavelengths for a predetermined length of time.

12. The synchronously pumped, optical parametric oscillator of claim 10, wherein the crystal has a length of between about 2 mm and 15 mm.

13. The synchronously pumped, optical parametric oscillator of claim 10, wherein the crystal has a length of between about 4 mm and 6 mm.

14. The synchronously pumped, optical parametric oscillator of claim 10, wherein opposing faces of the crystal in the optical path are cut at Brewster's angle.

15. The synchronously pumped, optical parametric oscillator of claim 10, wherein the LBO crystal is cut for noncritical phase matching.

16. The synchronously pumped, optical parametric oscillator of claim 10, wherein the pump source is Ti:sapphire.

17. The synchronously pumped, optical parametric oscillator of claim 10, wherein the resources include a rotatably mounted diffraction grating.

18. A synchronously pumped, optical parametric oscillator, comprising:
    a cavity with an optical path therethrough;
    an LBO crystal disposed in said optical path in said cavity at a beam waist position thereof;
    a high power pump source generating subpicosecond pulses in the range of 700 to 900 nm, oriented to supply pump pulses to said LBO crystal;
    a temperature controlling device to control the temperature of said LBO crystal to within at least about 2 degrees C.; and
    resources to provide an initial adjustment of the cavity length of the optical parametric oscillator to obtain a synchronous pumping condition of the optical parametric oscillator.

19. The synchronously pumped, optical parametric oscillator of claim 18, wherein the crystal has a length of between about 2 mm and 15 mm.

20. The synchronously pumped, optical parametric oscillator of claim 18, wherein the crystal has a length of between about 4 mm and 6 mm.

21. The synchronously pumped, optical parametric oscillator of claim 18, wherein opposing faces of the crystal in the optical path are cut at Brewster's angle.

22. The synchronously pumped, optical parametric oscillator of claim 18, wherein the LBO crystal is cut for noncritical phase matching.

23. The synchronously pumped, optical parametric oscillator of claim 18, wherein the pump source is a Ti:sapphire laser.

24. The synchronously pumped, optical parametric oscillator of claim 18, wherein the resources include a rotatably mounted diffraction grating.

25. A synchronously pumped, optical parametric oscillator, comprising:
    a cavity with an optical path therethrough;
    an LBO crystal disposed in said optical path in said cavity at a beam waist position thereof;
    a high power pump source generating subpicosecond pulses in the range of 700 to 900 nm, oriented to supply pump pulses to said LBO crystal;
    said cavity having a length selected to produce a synchronous pumping condition;
    a temperature controlling device to control the temperature of said LBO crystal to within at least about 2 degrees C.; and
    resources to diagnose a wavelength at which the optical parametric oscillator is operating.

26. The synchronously pumped, optical parametric oscillator of claim 25, wherein the crystal has a length of between about 2 mm and 15 mm.

27. The synchronously pumped, optical parametric oscillator of claim 25, herein the crystal has a length of between about 4 mm and 6 mm.

28. The synchronously pumped, optical parametric oscillator of claim 25, wherein opposing faces of the crystal in the optical path are cut at Brewster's angle.

29. The synchronously pumped, optical parametric oscillator of claim 25, wherein the LBO crystal is cut for noncritical phase matching.

30. The synchronously pumped, optical parametric oscillator of claim 25, wherein the resources include a rotatably mounted diffraction grating.

31. A synchronously pumped, optical parametric oscillator, comprising:

a cavity with an optical path therethrough;

a colinearly pumped, non-linear crystal disposed in said optical path in said cavity at a beam waist position thereof;

a high power pump source generating subpicosecond pulses oriented to supply pump pulses to said crystal;

said cavity having a length selected to produce a synchronous pumping condition; and a device to generate a frequency doubled beam in the crystal as a substantially collinear alignment beam.

32. The synchronously pumped, optical parametric oscillator of claim 31, wherein the device to generate a frequency doubled beam is a half wave plate.

33. The synchronously pumped, optical parametric oscillator of claim 31, wherein the device to generate a frequency doubled beam includes two mirrors.

34. The synchronously pumped, optical parametric oscillator of claim 31, wherein the device to generate a frequency doubled beam is a quarter wave plate.

35. The synchronously pumped, optical parametric oscillator of claim 31, wherein the crystal is cut for noncritical phase matching.

36. A synchronously pumped, optical parametric oscillator, comprising:

a cavity with an optical path therethrough;

a crystal disposed in said optical path in said cavity at a beam waist position thereof;

a pump source to supply pump pulses to the crystal;

said cavity having a length selected to produce a synchronous pumping condition; and a first and a second prism, each having an apex angle $\alpha$, and each disposed in said optical path, the first prism moving in a direction that is parallel to a bisector of apex angle $\alpha$, and the second prism moves in a direction perpendicular to the bisector of apex angle $\alpha$.

* * * * *

UNITED STATES PATENT AND TRADEMARK OFFICE
CERTIFICATE OF CORRECTION

PATENT NO. : 5,847,861  
DATED : 12-8-98  
INVENTOR(S) : Kafka, et al.

It is certified that error appears in the above-identified patent and that said Letters Patent is hereby corrected as shown below:

On the title page, the Attorney, Agent, or Firm- "Wison" should be --Wilson--.

Column 1, line 30 delete, "diagnosis" should be --diagnose--.

Column 3, line 25 delete, "diagnose" should be --diagnosing--.

Column 4, line 18 delete, "$KNBO_3$" should be --$KNbO_3$--.

Column 5, line 50 delete, , "OPO. It allows" should be --OPO it allows--.

Column 8, line 35 delete, "extend" should be --extent--.

Column 12, line 30 delete, "α Prism" should be.-- α. Prism--.

Column 14, line 3 delete, "femotosecond" should be --femtosecond--.

Signed and Sealed this

Fourth Day of May, 1999

Attest:

Q. TODD DICKINSON

*Attesting Officer*  *Acting Commissioner of Patents and Trademarks*

UNITED STATES PATENT AND TRADEMARK OFFICE
CERTIFICATE OF CORRECTION

PATENT NO. : 5,847,861
DATED : Dec. 8,1998
INVENTOR(S) : Kafka, et al.

It is certified that error appears in the above-identified patent and that said Letters Patent is hereby corrected as shown below:

On the title page, insert --[73]Assignee: Spectra-Physics Lasers, Inc.; Mountain Veiw, CA.--

Signed and Sealed this

Twentieth Day of July, 1999

Attest:

Q. TODD DICKINSON

*Attesting Officer*      *Acting Commissioner of Patents and Trademarks*

UNITED STATES PATENT AND TRADEMARK OFFICE
CERTIFICATE OF CORRECTION

PATENT NO. : 5,847,861
DATED : December 8, 1998
INVENTOR(S) : Kafka, et al

It is certified that error appears in the above-identified patent and that said Letters Patent is hereby corrected as shown below:

On the title page, insert -- [73] Assignee: Spectra-Physics Lasers, Inc.; Mountain View, CA. --

This certificate supersedes Certificate of Correction issued July 20, 1999.

Signed and Sealed this

Eleventh Day of April, 2000

Attest:

Q. TODD DICKINSON

*Attesting Officer*  *Director of Patents and Trademarks*